United States Patent
Drabycz et al.

(10) Patent No.: US 8,160,330 B2
(45) Date of Patent: Apr. 17, 2012

(54) TEXTURE QUANTIFICATION OF MEDICAL IMAGES BASED ON A COMPLEX-VALUED LOCAL SPATIAL FREQUENCY DISTRIBUTION OF A STOCKWELL TRANSFORM

(75) Inventors: Sylvia Anna Drabycz, Calgary (CA); Joseph Ross Mitchell, Calgary (CA)

(73) Assignee: Calgary Scientific, Inc., Calgary, Alberta (CA)

( * ) Notice: Subject to any disclaimer, the term of this patent is extended or adjusted under 35 U.S.C. 154(b) by 388 days.

(21) Appl. No.: 12/387,641

(22) Filed: May 5, 2009

(65) Prior Publication Data

US 2009/0279757 A1    Nov. 12, 2009

Related U.S. Application Data

(60) Provisional application No. 61/071,564, filed on May 6, 2008.

(51) Int. Cl.
*G06K 9/00* (2006.01)
(52) U.S. Cl. ......... 382/128; 382/131; 382/280; 600/410
(58) Field of Classification Search .................. 382/128, 382/131, 280; 128/922; 600/410, 416
See application file for complete search history.

(56) References Cited

U.S. PATENT DOCUMENTS

2003/0210045 A1* 11/2003 Mitchell et al. ............... 324/307
2005/0253863 A1* 11/2005 Mitchell et al. ............... 345/582

OTHER PUBLICATIONS

Johnston et al., "Segmentation of Multiple Sclerosis Lesions in Intensity Corrected Multispectral MRI", IEEE Trans. Medical Imaging, vol. 15, No. 2, pp. 154-169, 1996.*
Zhu H, Goodyear BG, Lauzon ML, Brown RA, Mayer GS, Law AG. Mansinha L, Mitchell R: "A new local multiscale Fourier analysis for medical imaging", Med Phys, vol. 30, pp. 1134-1141, 2003.
Zhu H, Zhang Y, Wei X, Metz LH, Law AG, Mitchell JR: 'MR multi-spectral texture analysis using space-frequency information, Proc. Int. Conf METMBS pp. 173-179, 2004.
Zhang Y, Zhu H, Metz LM, Mitchell JR: "A new MRI texture measure to quantify MS lesion progression", Proc. 12th Int. Soc. Magn. Reson. Med., p1500, 2004.

* cited by examiner

*Primary Examiner* — Francis M Legasse, Jr.
(74) *Attorney, Agent, or Firm* — Frank J. Bonini, Jr.; John F. A. Earley, III; Harding, Earley, Follmer & Frailey, P.C.

(57) ABSTRACT

A method for texture quantification is provided. Data indicative of a complex-valued local spatial frequency distribution in space-frequency domain are determined by processing a multi-dimensional image data set based on a Stockwell transform with a phase term corresponding to spatial locations of respective frequency components being expressed in terms of radial distance and angle of orientation. The complex-valued local spatial frequency distribution is indicative of a feature of the object. Data indicative of a low frequency energy distribution are determined by filtering the data indicative of a complex-valued local spatial frequency distribution using a band-pass filter having a predetermined low frequency energy bandwidth.

22 Claims, 10 Drawing Sheets

TEXTURE QUANTIFICATION OF MEDICAL IMAGES BASED ON A COMPLEX-VALUED LOCAL SPATIAL FREQUENCY DISTRIBUTION OF A STOCKWELL TRANSFORM This application claims the benefit of U.S. Provisional Patent Application No. 61/071,564 filed May 6, 2008, the entire contents of which are incorporated herein by reference.

FIELD OF THE INVENTION

The instant invention relates to the field of texture analysis of medical images and in particular to a method for texture quantification of medical images using a space-frequency transform.

BACKGROUND

Magnetic Resonance (MR) imaging provides excellent soft tissue contrast. Therefore, it is often used for diagnosing neurological diseases. Radiologists are trained to identify subtle changes in the appearance of tissues in MR images and, for example, use this information for differential diagnosis. For example, MR imaging is an important tool for diagnosing Multiple Sclerosis (MS) and monitoring a patient's response to therapy.

As a disease state of brain tissues changes, their appearance in an MR image—image "texture"—also changes. Image texture is quantified using, for example, space-frequency transforms. Space-frequency transforms quantitatively describe the magnitude of each spatial frequency component present in an image. Changes in image texture are then quantified by determining the corresponding changes in spatial frequency.

Reference Zhu H, Goodyear B G, Lauzon M L, Brown R A, Mayer G S, Law A G. Mansinha L, Mitchell R: "A new local multiscale Fourier analysis for medical imaging", Med Phys, Vol. 30, pp 1134-1141, 2003 teaches use of a space-frequency transform—the Stockwell Transform (ST) to determine correlations between changes in a broad range of spatial frequencies in MR images and the state of neurological diseases such as brain cancer and MS. Local spectra have been determined for small Regions Of Interest (ROIs) and differences in amplitude of the corresponding spectral components have been analyzed. For example, spectral components have been identified that discriminate between two genetic sub-types of brain tumors: one that is chemo-sensitive and one that is chemo-resistant. Furthermore, texture analysis studies on humans and animals have shown that spectral differences in MR images are associated with MS lesion evolution pathology. Results from these studies show that spatial frequency information provides a sensitive and specific indication of disease activity.

However, the clinical utility of ST-based image texture analysis is limited due to extensive data processing and data storage. Consequently, ST-based image texture analysis is often limited to a small ROI within the image that contains an area of suspected pathology. However, spatial frequency resolution is inversely proportional to the Field-Of-View (FOV) of the ROI being examined: $\Delta k=1/FOV$. Therefore, the analysis of small ROIs has the drawback of poor spatial frequency resolution. Poor spatial frequency resolution substantially limits the ability to examine subtle spectral changes correlating with disease progression. Furthermore, small ROIs limit the ability to analyze widespread sub-clinical abnormalities and to identify changes before they are visually apparent in conventional MR images.

It is desirable to provide a method for texture quantification of image data using a space-frequency transform that is efficient with regard to data processing and data storage.

It is also desirable to provide a method for texture quantification of image data using a space-frequency transform that enables texture analysis having sufficient spatial frequency resolution.

SUMMARY OF EMBODIMENTS OF THE INVENTION

Accordingly, one object of the present invention is to provide a method for texture quantification of image data using a space-frequency transform that is efficient with regard to data processing and data storage.

Another object of the present invention is to provide a method for texture quantification of image data using a space-frequency transform that enables texture analysis having sufficient spatial frequency resolution.

According to one aspect of the present invention, there is provided a method for texture quantification of image data. A multi-dimensional image data set indicative of an image of an object is received. Data indicative of a complex-valued local spatial frequency distribution in space-frequency domain are then determined by processing the multi-dimensional image data set based on a Stockwell transform with a phase term corresponding to spatial locations of respective frequency components being expressed in terms of a radial distance and an angle of orientation. The data indicative of a complex-valued local spatial frequency distribution, which is indicative of a feature of the object, are then provided for further processing, storage, or display.

According to another aspect of the present invention, there is further provided a storage medium having stored therein executable commands for execution on a processor. The processor when executing the commands receives a multi-dimensional image data set indicative of an image of an object and determines data indicative of a complex-valued local spatial frequency distribution in space-frequency domain by processing the multi-dimensional image data set based on a Stockwell transform with a phase term corresponding to spatial locations of respective frequency components being expressed in terms of a radial distance and an angle of orientation. The processor provides then the data indicative of a complex-valued local spatial frequency distribution, which is indicative of a feature of the object, for further processing, storage, or display.

The advantage of the present invention is that it provides a method for texture quantification of image data using a space-frequency transform that is efficient with regard to data processing and data storage.

A further advantage of the present invention is that it provides a method for texture quantification of image data using a space-frequency transform that enables texture analysis having sufficient spatial frequency resolution.

BRIEF DESCRIPTION OF THE DRAWINGS

A preferred embodiment of the present invention is described below with reference to the accompanying drawings, in which:

FIG. 6b is a diagram illustrating a time-evolution of T2 signal intensity within the ROI indicated in FIG. 6a;

FIGS. 7a and 7b are diagrams illustrating average LFE changes, FIG. 7a, and T2 intensity changes, FIG. 7b, for the lesion, the lesion border, and NAWM; and, FIG. 8 is a diagram illustrating a LFE filtered image of the human brain shown in FIGS. 3 and 6a.

DESCRIPTION OF THE PREFERRED EMBODIMENT

Figure 1A:
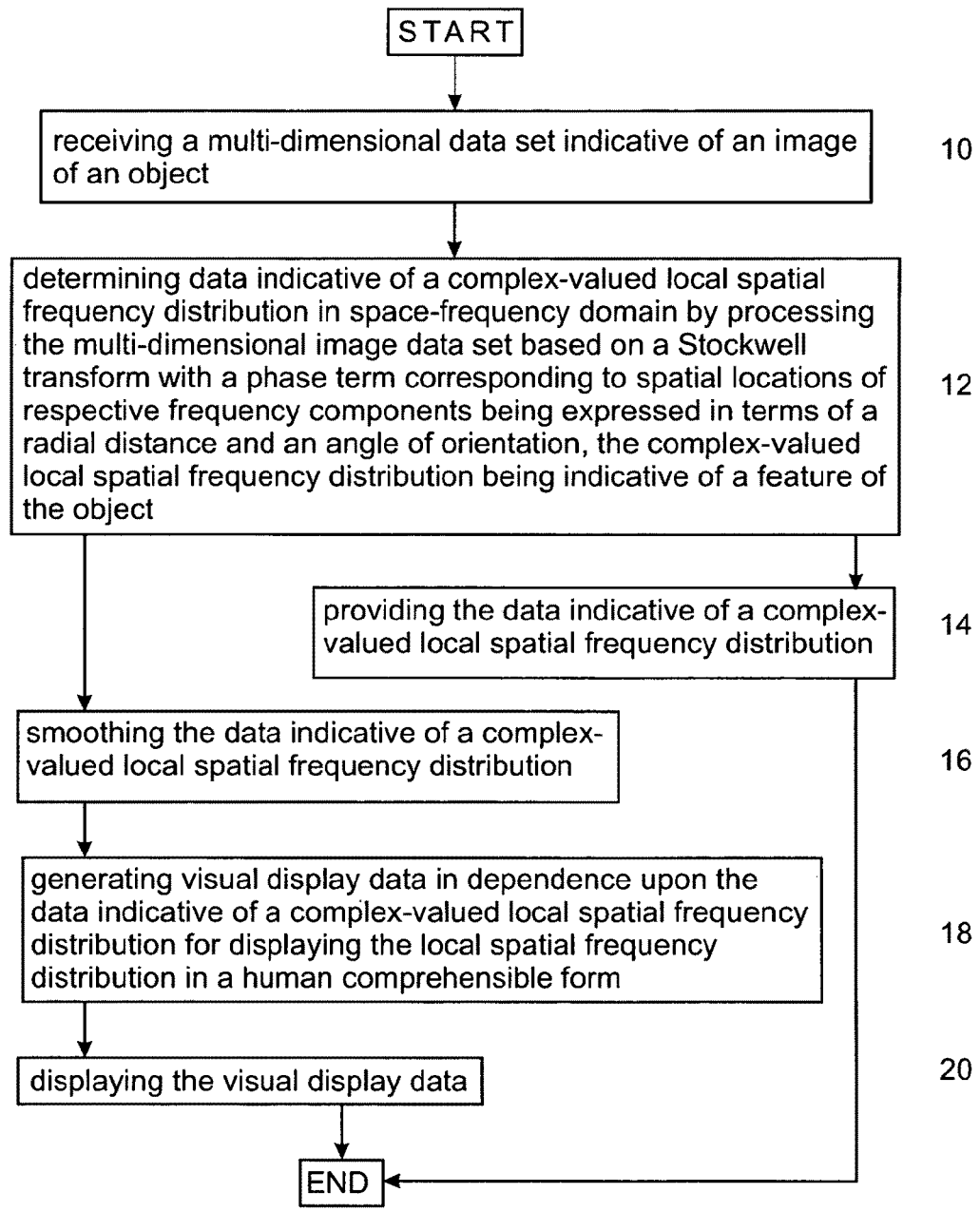
FIGS. 1a and 1b are simplified flow diagrams of methods for texture quantification according to a preferred embodiment of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While the description of the preferred embodiment herein below is with reference to image texture analysis of medical images—and in particular to image texture analysis of MRI data for diagnosing MS—for the sake of simplicity, it will become evident to those skilled in the art that the preferred embodiment is not limited thereto, but is also applicable, for example, for image texture analysis of Computed Tomography (CT) data for diagnosing stroke; Positron Emission Tomography (PET) data for diagnosing brain tumors; and Ultrasound data for diagnosing prostate lesions, as well as in numerous other fields such as, for example, analysis of remote sensing data, seismic data, etc. Furthermore, while the embodiments of the invention will be described for processing 2-dimensional data, it will become evident to those in the art that the embodiments of the invention are extendable for processing of 3-dimensional data or higher dimensional data.

In the description hereinbelow mathematical terms such as, for example, maximum, minimum, etc. are used for clarity, but as is evident to one skilled in the art these terms are not to be considered as being strictly absolute, but to also include degrees of approximation depending, for example, on the application or technology.

In the ST the local spatial frequency content of an image $I(x, y)$ is determined by applying a Gaussian localizing window $W$—scaled to a predetermined frequency—to the Fourier transform of the image $I(x, y)$:

$$S(x, y, k_x, k_y) = \int_{-\infty}^{\infty}\int_{-\infty}^{\infty} I(\alpha + k_x, \beta + k_y) \times W(\alpha, \beta, k_x, k_y) e^{2\pi j(\alpha x + \beta y)} d\alpha d\beta. \quad (1)$$

where x and y are spatial variables and $\alpha$ and $\beta$ are frequency variables.

The result is a Fourier-like multi-scale transform. The resulting horizontal and vertical spatial frequency values, $k_x$ and $k_y$, have units of cycles/cm ($cm^{-1}$). In the Polar ST (PST) a rotationally invariant space-frequency domain is created by using a window whose shape depends on its radial distance from the origin, $k=\sqrt{k_x^2+k_y^2}$, and which is rotated with the frequency orientation $\theta=\arctan(k_y|k_x)$:

$$W_P(\alpha, \beta, k, \theta) = e^{-2\pi^2\left[\left(\frac{\alpha\cos\theta+\beta\sin\theta}{k}\right)^2 + \left(\frac{-\alpha\sin\theta+\beta\cos\theta}{k\lambda}\right)^2\right]} \quad (2)$$

Where $\lambda$ is a parameter used to determine the relation between spatial and frequency resolution.

The angular frequency information in the PST is often averaged to produce a one-dimensional, rotationally invariant, local spectrum for each point in the image $I(x, y)$. Local spectra are determined by integrating the magnitude PST, indexed over k and $\theta$:

$$\bar{S}(x, y, k) = \int_0^{2\pi} |S(x, y, k, \theta| d\theta. \quad (3)$$

However, in this approach data corresponding to the entire four-dimensional space-frequency domain are processed and stored. Furthermore, from the magnitude operation in equation (3) follows that the resulting spectra are not invertible for recovering the original image.

These problems are addressed in the method for texture quantification according to a preferred embodiment of the invention. The ST is rewritten using the standard Gaussian window and replacing $\alpha$ with $\alpha-k_x$ and $\beta$ with $\beta-k_y$:

$$S(x, y, k_x, k_y) = e^{-2\pi j(k_x x + k_y y)} \times \quad (4)$$
$$\int_{-\infty}^{\infty}\int_{-\infty}^{\infty} I(\alpha, \beta) e^{-2\pi^2\gamma^2\left[\left(\frac{\alpha}{k_x}-1\right)^2 + \left(\frac{\beta}{k_y}-1\right)^2\right]} \times e^{2\pi j(\alpha x + \beta y)} d\alpha d\beta.$$

The phase term $e^{2\pi j(k_x x + k_y y)}$ is then multiplied using the relations $k_x=k\cos\theta$ and $k_y=k\sin\theta$ to express the ST in terms of the radial distance k and angle of orientation $\theta$, $$S(x, y, k, \theta) = \quad (5)$$
$$\int_{-\infty}^{\infty}\int_{-\infty}^{\infty} I(\alpha, \beta) e^{-2\pi^2\gamma^2\left[\left(\frac{\alpha}{k\cos\theta}-1\right)^2 + \left(\frac{\beta}{k\sin\theta}-1\right)^2\right]} \times e^{2\pi j(\alpha x + \beta y)} d\alpha d\beta.$$

The phase term corresponds to the spatial location of the frequency components. According to the Fourier shift theorem the magnitude of the resulting spectra are identical to those obtained from shifting the Fourier domain of the image, but with different phase. By correcting for the phase, the average magnitude of the complex data is determined without having to take the magnitude of each value as in equation (3).

Local spatial frequency distributions are created by integrating the ST frequencies over the angle of orientation θ:

$$S(x, y, k) = \int_0^{2\pi} \left[ \int_{-\infty}^{\infty}\int_{-\infty}^{\infty} I(\alpha, \beta) e^{-2\pi^2\gamma^2\left[\left(\frac{\alpha}{k\cos\theta}-1\right)^2 + \left(\frac{\beta}{k\sin\theta}-1\right)^2\right]} \times e^{2\pi j(\alpha x+\beta y)} d\alpha d\beta \right] d\theta \qquad (6)$$

Note that now only the localizing windows depend on the angle of orientation θ. Therefore, equation (6) is rewritten as:

$$S(x, y, k) = \int_{-\infty}^{\infty}\int_{-\infty}^{\infty} I(\alpha, \beta) \times \qquad (7)$$
$$\left[ \int_0^{2\pi} e^{-2\pi^2\gamma^2\left[\left(\frac{\alpha}{k\cos\theta}-1\right)^2 + \left(\frac{\beta}{k\sin\theta}-1\right)^2\right]} d\theta \right] \times e^{2\pi j(\alpha x+\beta y)} d\alpha d\beta.$$

In equation (7), the Fourier transform of the image is multiplied by the sum of the windows for all angles of orientation θ. The energy at frequency k is obtained by performing a single inverse 2D Fourier transform. This is substantially more efficient than calculating the contribution of each ($k_x$, $k_y$) component and then averaging. In addition, data in the intermediate 4D space-frequency domain, $S(x, y, k_x, k_y)$, are not determined and stored.

However, implementation of equation (7) on discrete data is difficult. The continuous integral over the angles of orientation θ is converted to a partial sum, and floating point values of k are converted to integral indices. To further simplify the calculations, the localizing windows are determined as a function of k. For example, circularly symmetric windows whose radial cross-sections are Gaussian functions with width proportional to the frequency k are determined, $$W_d(\alpha, \beta, k) = e^{-2\pi^2\left(\frac{\sqrt{\alpha^2+\beta^2}}{k}-1\right)^2}, k \neq 0. \qquad (8)$$

In the discrete domain the new transform is written as:

$$S_d(x, y, k) = \sum_{\alpha=0}^{N-1}\sum_{\beta=0}^{N-1} I(\alpha, \beta) W_d(\alpha, \beta, k) e^{2\pi j(\alpha x+\beta y)/N} \qquad (9)$$

for an image size N×N and discrete spatial and spectral variables. Optionally, for visualization the local spatial frequency distribution, $S_d(x, y, k)$, is smoothed using a standard smoothing function. Smoothing reduces spatial artifacts arising from the employment of the ring-shaped localizing windows according to equation (8).

The local spatial frequency distribution, $S_d(x, y, k)$, is complex-valued. Therefore, unlike $\vec{S}(x,y,k)$ in equation (3), $S_d(x, y, k)$ is invertible to recover the original image, $i(x, y)$. Inversion involves summing $S_d(x, y, k)$ over k. In particular, $$i(x, y) = \mathscr{F}^{-1}\left\{\frac{\mathscr{F}\left\{\sum_k S_d(x, y, k)\right\}}{A_N(\alpha, \beta)}\right\} \qquad (10)$$

where F and $F^{-1}$ denote the forward and inverse Fourier transforms, respectively, and $A_N(\alpha, \beta)$ is calculated by summing the localizing windows over all values of k:

$$A_N(\alpha, \beta) = \sum_{k=1}^{N/\sqrt{2}} e^{-2\pi^2\left(\frac{\sqrt{\alpha^2+\beta^2}}{k}-1\right)^2}. \qquad (11)$$

Invertibility has various advantages. For example, a space-frequency filter F(x, y, k) is applicable to the spectra prior to inversion:

$$f'(x, y) = \mathscr{F}^{-1}\left\{\frac{\mathscr{F}\left\{\sum_k S_d(x, y, k) F(x, y, k)\right\}}{A_N(\alpha, \beta)}\right\}. \qquad (12)$$

The filter is used, for example, for selectively enhancing or suppressing spatial frequencies to improve the specificity of the texture analysis.

The Fourier transforms and inverse Fourier transforms disclosed above are calculated, for example, using various acceleration methods such as, for example, vector processors, graphical processing units, and programmable gate arrays.

Referring to FIG. 1a, a flow diagram of a method for texture quantification according to the preferred embodiment of the invention is shown. At 10, a multi-dimensional image data set indicative of an image of an object is received. At 12, the multi-dimensional image data set is then processed based on a Stockwell transform—with a phase term corresponding to spatial locations of respective frequency components being expressed in terms of radial distance and angle of orientation—for determining data indicative of a complex-valued local spatial frequency distribution in space-frequency domain. The complex-valued local spatial frequency distribution is indicative of a feature of the object. At 14, the data indicative of a complex-valued local spatial frequency distribution are provided, for example, for storage or further processing. Optionally, the data indicative of a complex-valued local spatial frequency distribution are smoothed using, for example, a standard smoothing function—16—prior to generation of visual display data in dependence upon the data indicative of a complex-valued local spatial frequency distribution for displaying the local spatial frequency distribution in a human comprehensible form—18—and displaying of the visual display data—20.

Figure 1B:
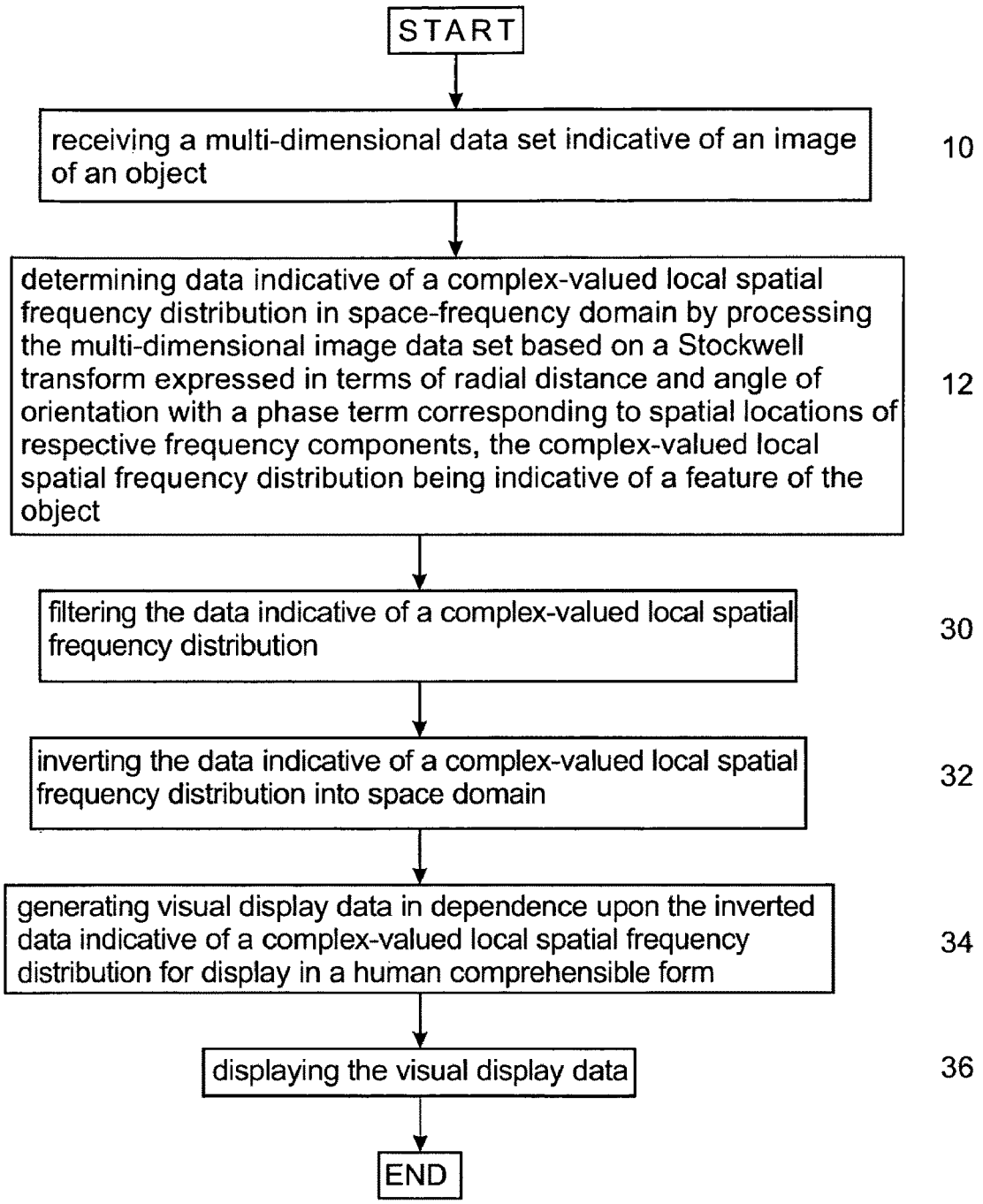

Referring to FIG. 1b, a flow diagram of a method for texture quantification according to another preferred embodiment of the invention is shown. The steps 10 and 12 are the same as the ones shown in FIG. 1a, which are followed by filtering of the data indicative of a complex-valued local spatial frequency distribution—30. The filtered data indicative of a complex-valued local spatial frequency distribution are then inverted into space domain —32. At 34, visual display data are generated in dependence upon the inverted data indicative of a complex-valued local spatial frequency distribution for display in a human comprehensible form and displayed—36. Optionally, the inverted data indicative of a complex-valued local spatial frequency distribution are provided, for example, for storage or further processing. Further optionally, data indicative of a low frequency energy distribution are determined by filtering the data indicative of a complex-valued local spatial frequency distribution using a band-pass filter having a predetermined low frequency energy bandwidth.

Figure 2:
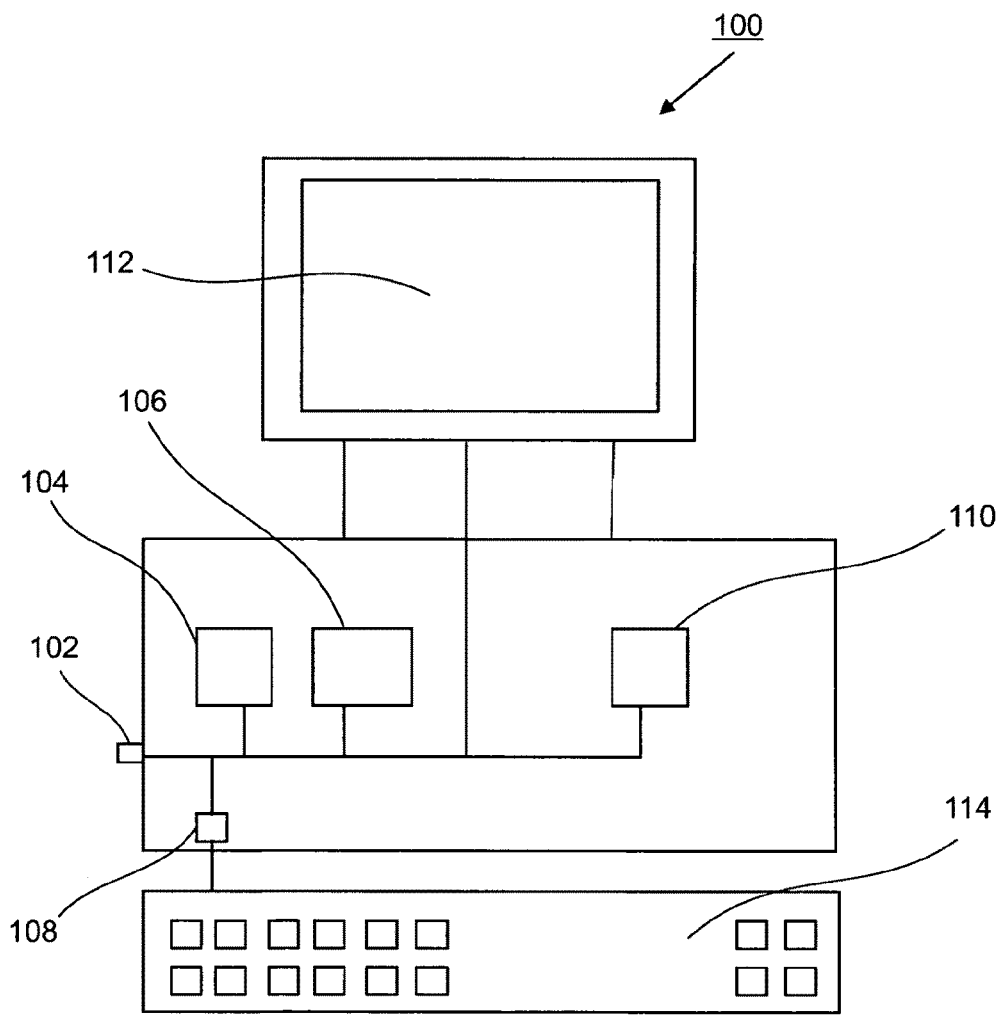
FIG. 2 is a simplified block diagram of a processing system according to the preferred embodiment of the invention for implementing the methods for texture quantification shown in FIGS. 1a and 1b.

Referring to FIG. 2, shown is a processing system 100 according to a preferred embodiment of the instant invention, for implementing the above methods for texture quantification. A multi-dimensional medical imaging dataset is received at input port 102. Using electronic circuitry such as a processor 104 the dataset is then digitally processed. The system 100 comprises a storage medium 110 having stored therein executable commands for execution on the processor 104 for performing the processing corresponding to the above method for texture quantification according to the preferred embodiment of the invention. Alternatively, the processor 104 comprises electronic circuitry designed for performing at least a portion of the processing in a hardware implemented fashion. The system 100 further comprises memory 106 such as RAM in communication with the processor 104 for storing data during execution. The processing is controlled by a user viewing, for example, a graphical representation of the data and by providing control commands via port 108—connected, for example, to a keyboard 114—to the processor 104. Optionally, the display 112 is a graphical user interface facilitating user interaction during processing. Further optionally, the system 100 is a retrofit of an existing image processing system and the method for texture quantification according to embodiments of the invention is implemented, for example, as executable commands provided to the processor 104 of the system 100 from a storage medium or as a hardware component for incorporation into the system 100.

MS is an autoimmune disease that causes both focal and diffuse pathology in the central nervous system. MR imaging is the principal imaging modality used to diagnose and monitor MS. MS lesions are considered "active" if they enhance on T1-weighted MR imaging after administration of a gadolinium-based contrast agent. Contrast-enhancing lesions signify a breakdown of the blood-brain barrier. Active lesions enhance on MR images for 3 weeks on average. On the other hand, "inactive" lesions do not enhance on T1 imaging. Both, active and inactive lesions appear hyperintense on T2-weighted MR images for extended periods—up to 5-6 months.

Studies have shown the temporal T2 intensity to be a sensitive indicator of MS disease activity. Earlier detection of disease activity allows earlier treatment leading to improved long-term outcomes. The method for texture quantification according to the preferred embodiment of the invention provides the sensitivity for detecting smaller changes in the MR images of patients with MS than existing methods.

Spectral distributions derived using the PST and equation (3) has shown a correlation between changes in Low-Frequency Energy (LFE) of MR images and changes in MS lesions. The LFE has been defined as the area under the magnitude PST spectrum below a threshold frequency. For example, the portion of the spectrum with the greatest differences between Normal-Appearing White Matter (NAWM) and MS lesions was found in one study to be below 5 cm$^{-1}$, as disclosed in Zhu H. Zhang Y. Wei X, Metz L H, Law A G, Mitchell J R: "MR multi-spectral texture analysis using space-frequency information", Proc. Int. Conf METMBS pp 173-179, 2004. Another study showed that frequencies below 2.88 cm$^{-1}$ change markedly during MS lesion development. A 31% increase in LFE was observed when tissues evolved from NAWM to an active lesion. When lesions subsequently became inactive, this change was accompanied by a significant decrease in LFE. However, the LFE of inactive lesions remained 12% higher than in NAWM, as disclosed in Zhang Y, Zhu H, Metz L M, Mitchell J R: "A new MRI texture measure to quantify MS lesion progression", Proc. 12$^{th}$ Int. Soc. Magn. Reson. Med., p 1500, 2004. These studies show that spatial frequency information provides a sensitive and substantially precise indication of disease activity enabling, for example, evaluation of therapeutic responses from MS patients in clinical trials and prediction of lesion activity in T2-weighted MR images.

However, the intensive data processing for calculating the ST has thus far limited analysis to small ROIs. As a result, the local spatial frequency distributions had poor frequency resolution, severely restricting the amount of information extracted therefrom. For example, in the study mentioned above a ROI of size 3.125 cm was used, resulting in a spectral resolution of $\Delta k=0.32$ cm$^{-1}$. As a result, the spectral components below 2.88 cm$^{-1}$ that were involved in lesion development had only 8 non-zero values for each pixel. The method for texture quantification according to embodiments of the invention enables analysis of entire images, increasing the number of samples available over a same space-frequency interval. This enables a substantially more accurate determination of the contribution of spectral components within specific frequency bandwidths. Furthermore, because the low frequency spectral values depend on the local neighborhood, the cropping of a ROI results in a change of the low frequency values. Therefore, the LFE differs with varying ROI size.

In previous studies there has been no attempt to define a cut-off value in LFE between normal and abnormal tissues. This is largely due to the difficulty in comparing LFE values between patients because the actual values in normal and abnormal tissues are different. Part of the difficulty arises due to the fact that the PST produces only a magnitude spectrum, as shown in equation (3); therefore, all spectral values are positive. Using the method for texture quantification according to the preferred embodiment of the invention, creation of images containing only a predetermined frequency bandwidth is enabled by filtering the complex-valued spatial frequency distribution and inverting the filtered complex-valued spatial frequency distribution. For example, creation of maps of the portion of image intensity associated with the LFE bandwidth is enabled, allowing improved discrimination between normal and pathological tissues.

The method for texture quantification according to embodiments of the invention has been used to analyze MR images from a relapsing-remitting MS patient involved in a MS treatment trial, imaged using a 3T MR scanner. Axial T2 (TE=80 ms) and Proton-Density (PD) (TE=30 ms) weighted images were obtained (TR=2716 ms, FOV=24 cm, matrix size=512×512, slice thickness=3 mm, no gap). MR scans were taken at monthly intervals for 9 months: 3 months before treatment (months −3 to −1) and for 6 months after the start of treatment (months 1 to 6). Treatment was initiated in month 0. T1-weighted images (TR/TE=650/8 ms) were acquired before and 5 minutes after the intravenous injection of gadolinium contrast agent (0.1 mmol/kg) to determine which lesions were enhancing (active) and which were non-enhancing (inactive).

The T1 post-contrast baseline image was co-registered to the T2 baseline image based on a normalized mutual information similarity metric. All other time-points for the three contrasts were then registered to their respective baseline images with a rigid registration that minimized the sum of squared differences. The PD-weighted images were not registered to the T2 images since these were acquired simultaneously. One slice of the imaging volume has been selected for texture analysis, which was extracted from the volume for each contrast. Within this slice, an enhancing lesion developed in the left hemisphere in month 1. Bias field effects in the T2 and PD-weighted images were removed using a nonparametric intensity non-uniformity normalization (N3) process. Variations in signal intensity between T2-weighted images were corrected by calibrating the image intensity to the average signal within ventricular CerebroSpinal Fluid (CSF). Images were normalized by segmenting the anterior horn of the lateral right ventricle using a level-set contour, dividing the image by the average pixel intensity in the contour and promoting the result from unsigned 16-bit integer to 32-bit floating point values. This correction is used since MR images do not have quantitative units and it has been previously used in texture analysis of MS lesions.

The center of the lesion was defined as the center of mass of the homogenous, hyperintense region on the T2-weighted image. The location of the lesion was verified by segmenting the lesion in the T1 post-contrast image and overlaying the ROI on the T2-weighted image. An area of heterogeneous, slightly less hyperintense T2 intensity of approximately uniform thickness surrounding the lesion was selected as the lesion border. A 32×32 pixel ROI surrounding the enhancing lesion and its border had been identified, as will be illustrated hereinbelow. A representative sample of NAWM was obtained by performing a single channel fuzzy C-means segmentation of the PD-weighted images. The PD-weighted images were used for their good contrast between gray and white matter. Four classes were used for the segmentation, representing white matter, gray matter, CSF and pathological tissue. The brain was extracted from the skull using a level-set contour prior to segmentation. The average NAWM was defined as pixels that were segmented as white matter at all time instances. A morphological open operation was then performed, comprising one erosion and one dilation with a 4-connected neighborhood, to remove spurious pixels. The final segmentation was overlaid on the month-4 PD image to visually verify the segmentation.

The average LFE and T2 signal intensity were examined, as well as relative changes over time. The complex-valued local spatial frequency distribution of each pixel in the image slice was calculated, at months −3 to 3 and month 6, according to equation (9) using the localizing window in equation (8). Images were cropped to size 428×428 to exclude regions outside the brain. To remove spatial artifacts caused by the localizing window, each magnitude frequency image $|S_d(*,*,k)|$ was convolved with a Gaussian function of standard deviation $\sigma=1.5*N/k$ before analyzing the spectra. For comparison, the PST of the 32×32 pixel ROI described above was also evaluated.

The LFE magnitude was calculated by determining the area under the spectrum between 0.8 and 3.6 cm$^{-1}$. Frequencies below a threshold were omitted since these correspond more to structures than to lesions and, therefore, are similar for all points within the image. The upper limit was determined to include spectral areas previously shown to be important in MS lesion evolution while minimizing the effect of noise, which tends to dominate the high spatial frequencies.

The signal components within the LFE bandwidth were isolated by multiplying each unsmoothed complex-valued local spatial frequency distribution by a box-shaped band-pass filter F(x, y, k) such that:

$$F(x, y, k) = \begin{cases} 1 & \text{for } 0.8 \text{ cm}^{-1} \leq k \leq 3.6 \text{ cm}^{-1} \\ 0 & \text{otherwise,} \end{cases} \quad (13)$$

and inverting the filtered transform according to equation (12).

To determine if the transformed data was providing new temporal information from the T2 images, the sum of the unsmoothed complex-valued local spatial frequency distribution over the frequency variable was calculated. The average spatial frequency distribution for each region (lesion, border and NAWM) as well as the average T2 signal was calculated for each month and a correlation performed. The accuracy of the forward and inverse transform was verified by determining the Root Mean Squared (RMS) error between the original image and the inverted complex-valued local spatial frequency distribution—without a filter—according to equation (10).

Using the method for texture quantification according to the preferred embodiment of the invention the complex-valued local spatial frequency distribution of each pixel of the 428×428 pixels image was calculated in approximately 65 seconds. The transformed image data had a maximum of $N \times N \times (N/\sqrt{2})$ complex values. Therefore, transformation of each 428×428 pixels image occupied approximately 443 MB for storage of the complex array, or 221 MB for the magnitude spectra. Analysis of the same sized image using the state of the art ST takes several hours to calculate and occupies over 250 GB for storage. The PST is performed without storing the intermediate four-dimensional array of the ST, and, therefore, less storage space is occupied. However, analysis of a same sized image using the PST still takes several hours. Analysis of a 32×32 pixels ROI using the PST took approximately 1 second.

Figure 3:
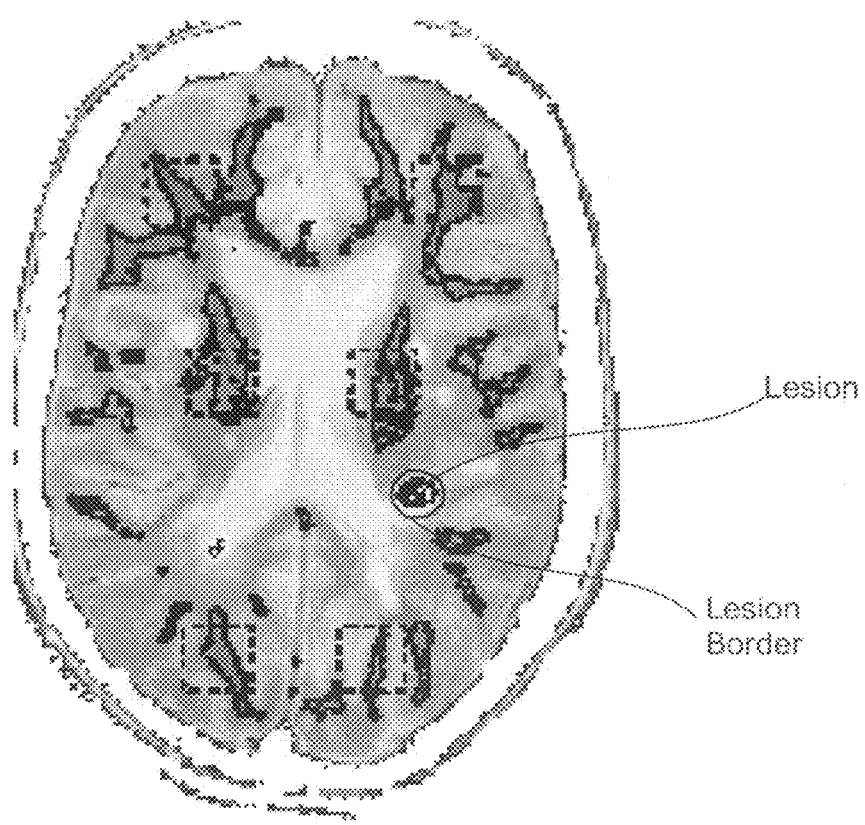
FIG. 3 is a diagram illustrating results of NAWM segmentation in a PD-weighted image of a human brain.

6920 pixels were classified as NAWM by the segmentation; 166 pixels were identified as lesions; and 299 pixels were identified as lesion border. The results of the segmentation, overlaid in dark lines on the month-4 PD-weighted image are shown in FIG. 3. The figure also shows regions denoted as lesion and lesion border. Since the PST analysis is limited to ROIs, to get a representative area of NAWM, six 32×32 pixels ROIs were chosen from the anterior, posterior, and internal white matter regions—left and right hemispheres—indicated in FIG. 3 by dashed lines. The PST spectrum for each pixel in each of these areas was calculated and the magnitudes were averaged for determining an average PST spectrum for NAWM. For the lesion and the lesion border the PST of a 32×32 pixels ROI surrounding the center of mass of the lesion was taken followed by averaging the magnitude spectra of pixels within the area defined as lesion and lesion border, respectively.

Figure 4A:
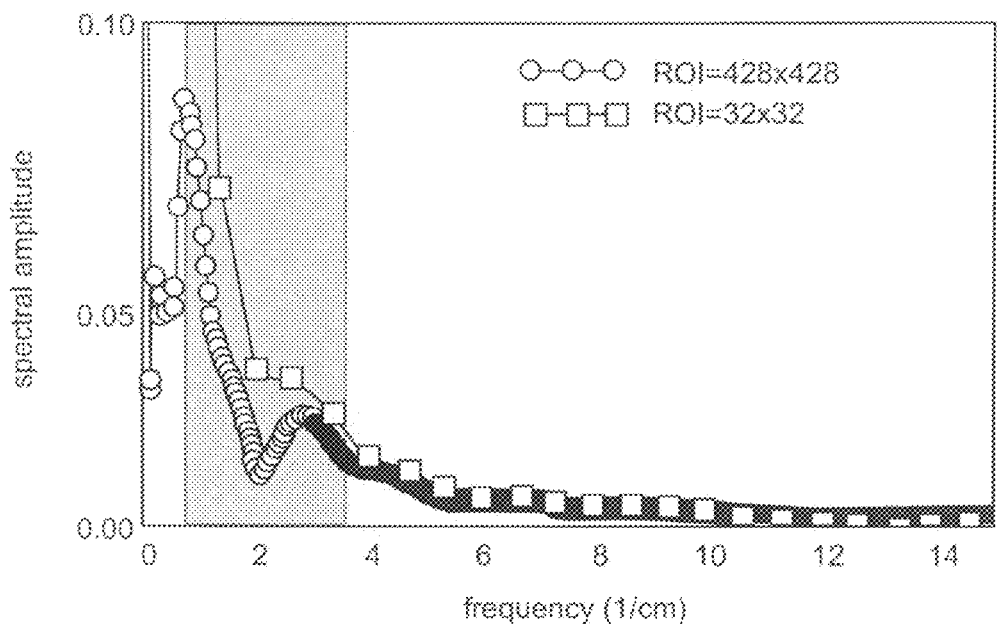
FIGS. 4a to 4c are diagrams illustrating average local spectra in regions within a lesion, a lesion border, and NAWM, respectively.
Figure 4B:
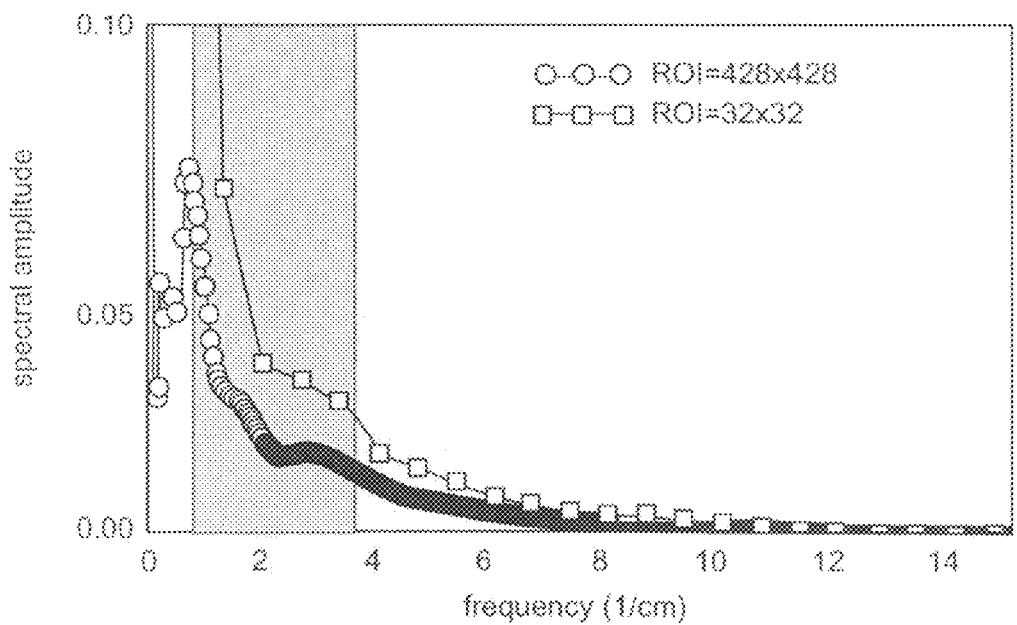
Figure 4C:
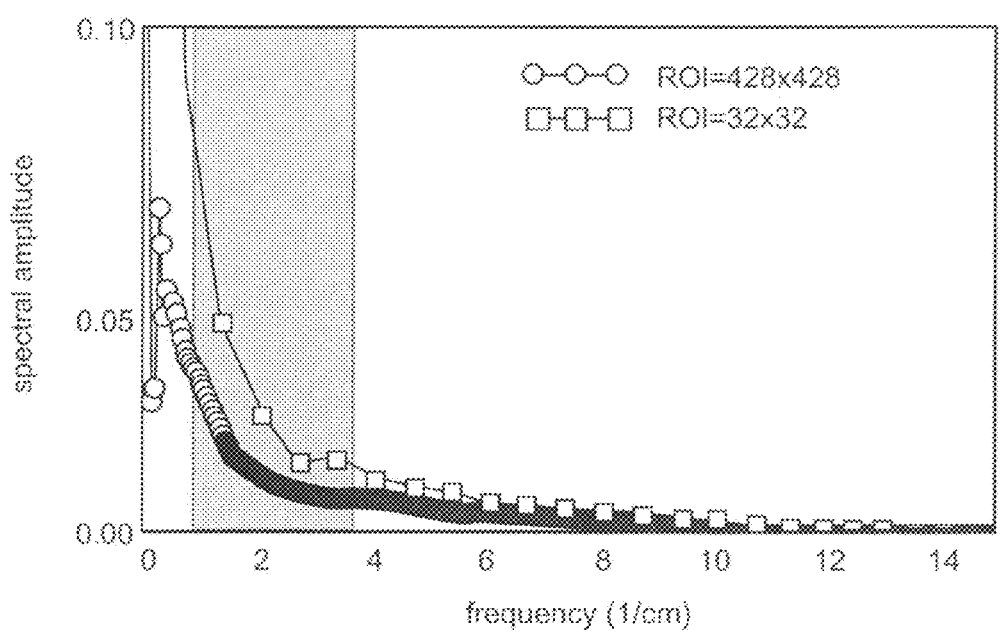

Using the method for texture quantification according to the preferred embodiment of the invention the spectrum was calculated for every point within the image followed by determining the average magnitude spectrum for all points within the areas defined as lesion, lesion border, and NAWM. FIGS. 4a to 4c show the local average spectra using both methods. Low frequency differences are evident in the spectra. These differences are caused by the different local neighborhood and wrap-around effects when examining a ROI as compared to the entire image. The method for texture quantification according to the preferred embodiment of the invention incorporates information from structures surrounding the area being examined. Other differences occur due to the slightly different shape of the window employed in the two methods.

Figure 5A:
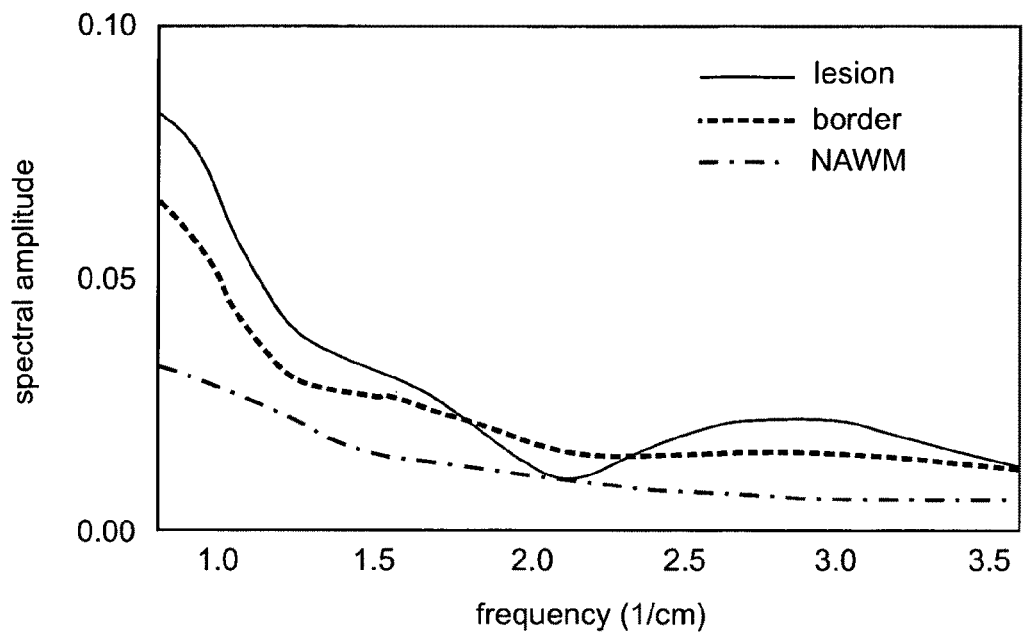
FIGS. 5a and 5b are diagrams illustrating magnitude spectra obtained using the method for texture quantification according to the preferred embodiment of the invention and a state of the art PST method, respectively.
Figure 5B:
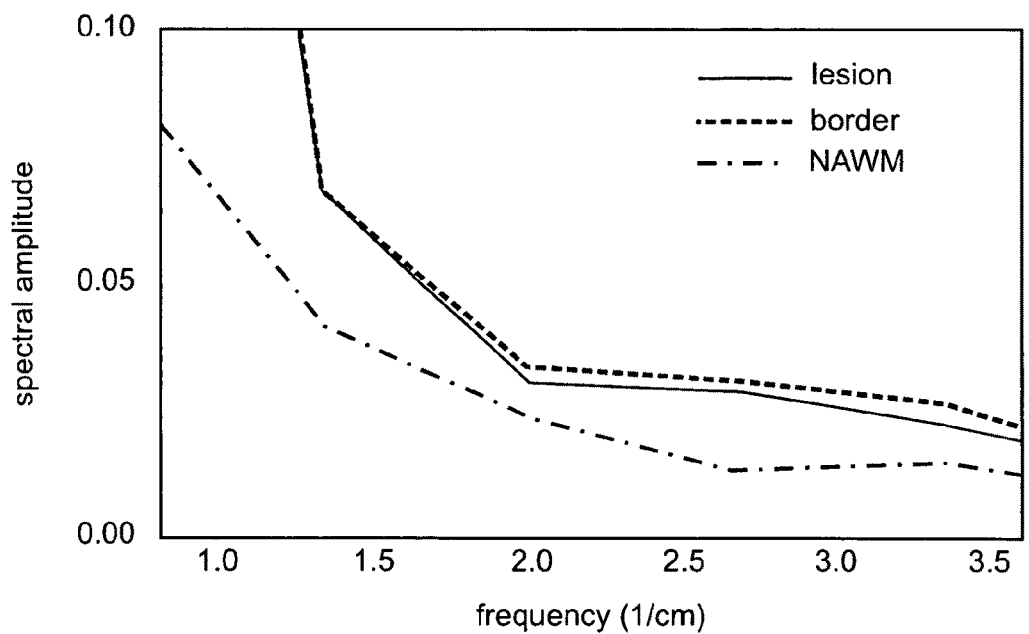

The spectral resolution of the method for texture quantification according to the preferred embodiment of the invention was 0.05 cm$^{-1}$, i.e. substantially higher than that of the PST (0.67 cm$^{-1}$). Therefore, there are 56 points spanning the LFE bandwidth as compared to only 4 spectral points with the PST, allowing improved identification of differences in the shape of the magnitude spectra. With the improvement in spectral resolution it is revealed, in FIG. 4a, that within the bright lesion there is a peak in the spectrum at 2-4 cm$^{-1}$. This peak is lower in the border of the lesion, FIG. 4b, and absent in NAWM, FIG. 4c. The peak corresponds to structures of size 2.5 to 5.0 mm, which approximately corresponds to the radius of the lesion—which has a major axis of 6.9 mm and a minor axis of 5.0 mm and an average radius of 3.0 mm. The three regions have substantial spectral differences that are well separated, as shown in FIG. 5a. Conversely, using the PST the lesion and border are substantially inseparable, as shown in FIG. 5b.

Figure 6A:
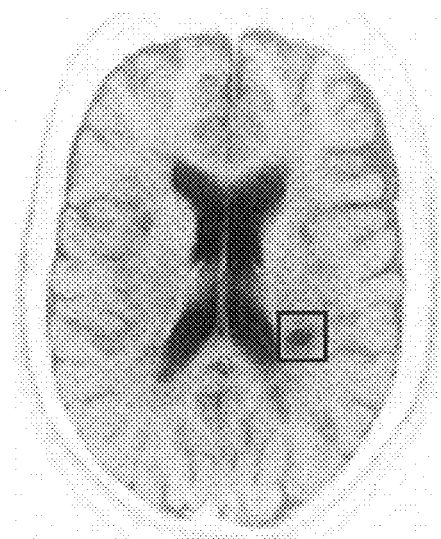
FIG. 6a is a diagram illustrating a T2-weighted image of a human brain with a square indicating a ROI surrounding an enhancing lesion.
Figure 6B:
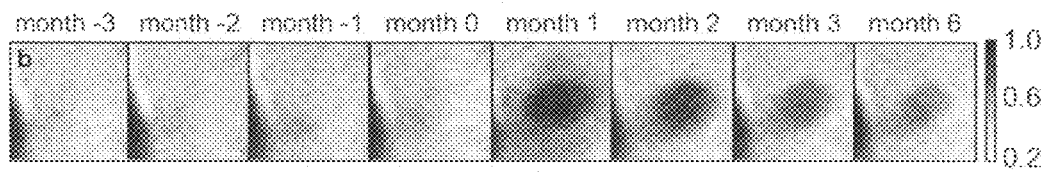
Figure 6C:
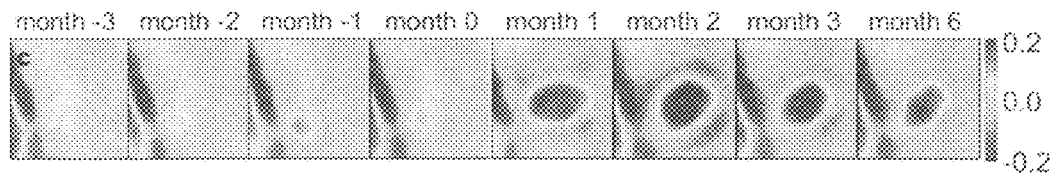
FIG. 6c is a diagram illustrating LFE maps generated by applying the method for texture quantification according to the preferred embodiment of the invention to the T2-weighted images shown in FIG. 6b.

FIG. 6a shows the T2 image at month 1, with an indication of the 32×32 pixels ROI of the enhancing lesion. The ROI time-course shows the lesion evolution over 9 months in the T2-weighted image, as shown in FIG. 6b. The LFE map, shown in FIG. 6c, was generated using the method for texture quantification according to the preferred embodiment of the invention by removing frequencies outside the LFE bandwidth and inverting. Therefore, only the T2-signal components involved in MS lesion development appear. FIG. 6c shows that the LFE magnitude increases in the core of the lesion upon enhancement, but decreases and becomes negative in the lesion border.

Figure 7A:
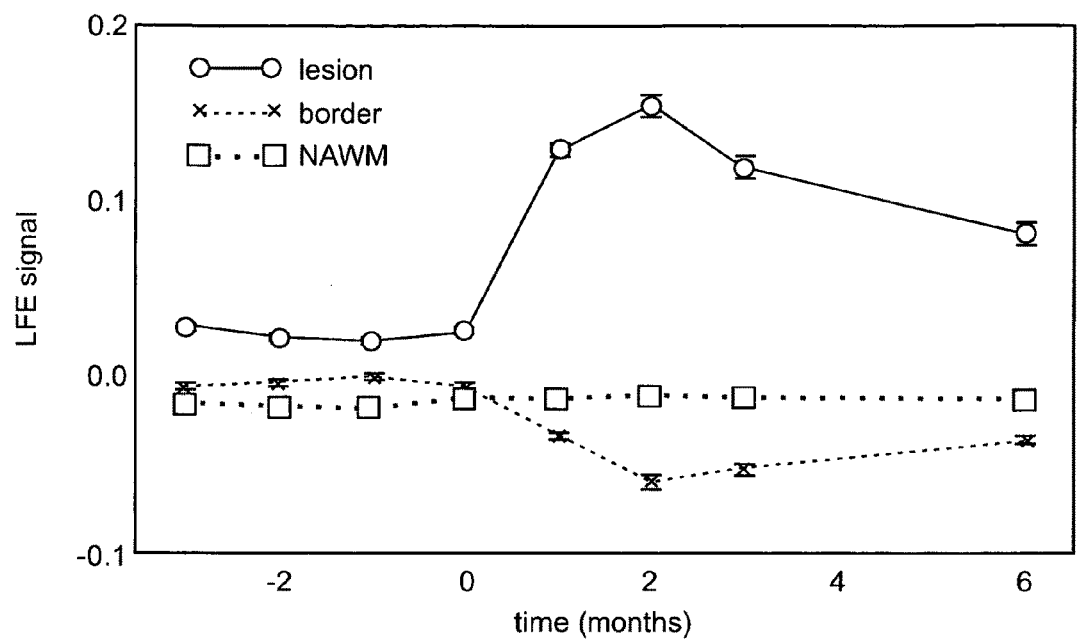
Figure 7B:
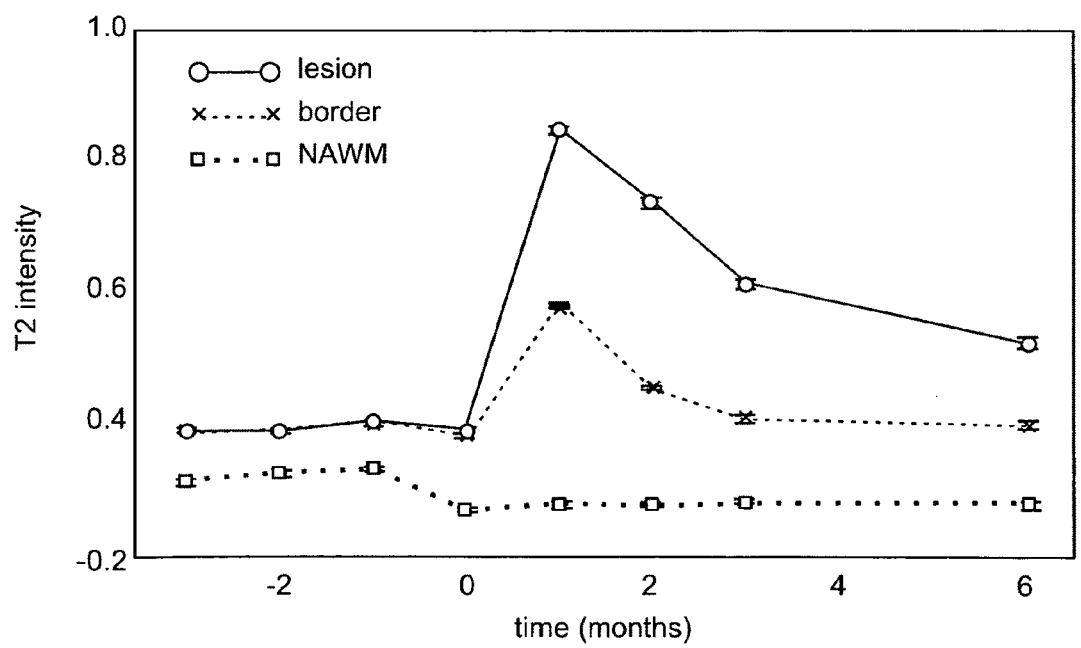

FIGS. 7a and 7b show the time courses for three 5×5 pixels regions within the lesion, the tissue surrounding the lesion, and NAWM. FIG. 7a shows that, while the LFE of NAWM remains close to zero, there is an increase in the LFE when the lesion becomes enhancing. This increase peaks in month 2 and slowly decreases, but remains above the LFE before the increase. The border of the lesion, which appears slightly less hyperintense on T2 than the core lesion, shown in FIG. 7b, actually has a negative LFE value at month 1 with a slow rise over the subsequent months. In comparison, the T2 intensity of the border shows a small increase at month 1 and a return to values before the increase.

The relative changes in the LFE are substantially larger than in the T2 intensity because a baseline of the LFE is close to zero. For example, the lesion showed a 114% intensity increase on T2 and a 51% increase in the border from month 0 to month 1. In the LFE analysis, the lesion had a 378% intensity increase and the border had a 727% intensity decrease. This provides a simple method to normalize baseline lesion intensity and indicates that the LFE intensity is close to zero in tissue that does not contain lesions.

The correlation coefficients for the sum of the complex spectra with T2 intensity were: 0.992 for lesion, 0.280 for the border and −0.755 for NAWM. These results indicate that the complex spectra do provide different temporal information than T2 signal intensity alone for border and NAWM regions, as shown in FIGS. 7a and 7b. The mean RMS error between the inverted and original images was 1.6×10$^{-10}$ (maximum=3.2×10$^{-10}$, minimum=8.6×10$^{-12}$).

The bandwidth of 0.8 to 3.6 cm$^{-1}$ used in this study corresponds to structures of size 0.28 cm to 1.25 cm: The employed ring-shaped localizing windows highlight circular shaped structures, such as lesions. By filtering frequency components outside the bandwidth, the effect of low frequency components—the signal intensity in slowly varying, large scale structures—and high frequency components—the rapidly varying intensities associated with noise—are removed. This allows investigation of signal changes occurring on the scale of MS lesions only, resulting in very low signal intensity in regions of NAWM and high intensity in lesions and borders between structures of differing signal intensity. The improvement in spatial resolution suggests a narrower bandwidth for examining spectral changes.

After filtering of the complex spectrum to isolate the LFE frequencies, structures within the brain, such as lesion and ventricle, are surrounded by a border of negative values. This is due to the shape of the localizing windows used in the space-frequency analysis. The multiplication of the image with the ring-shaped localizing windows according to equation (9) in the Fourier domain implies a convolution of the image in space domain with a sinc-like function that oscillates between positive and negative values. The center of the function has a high positive value, while the negative side-lobes result in negative LFE values. This difference enables separating lesions from ventricular CSF, which is a problem in conventional imaging. The region of decreased LFE surrounding lesions indicates areas where tissue damage is transient and quickly repaired.

Figure 8:
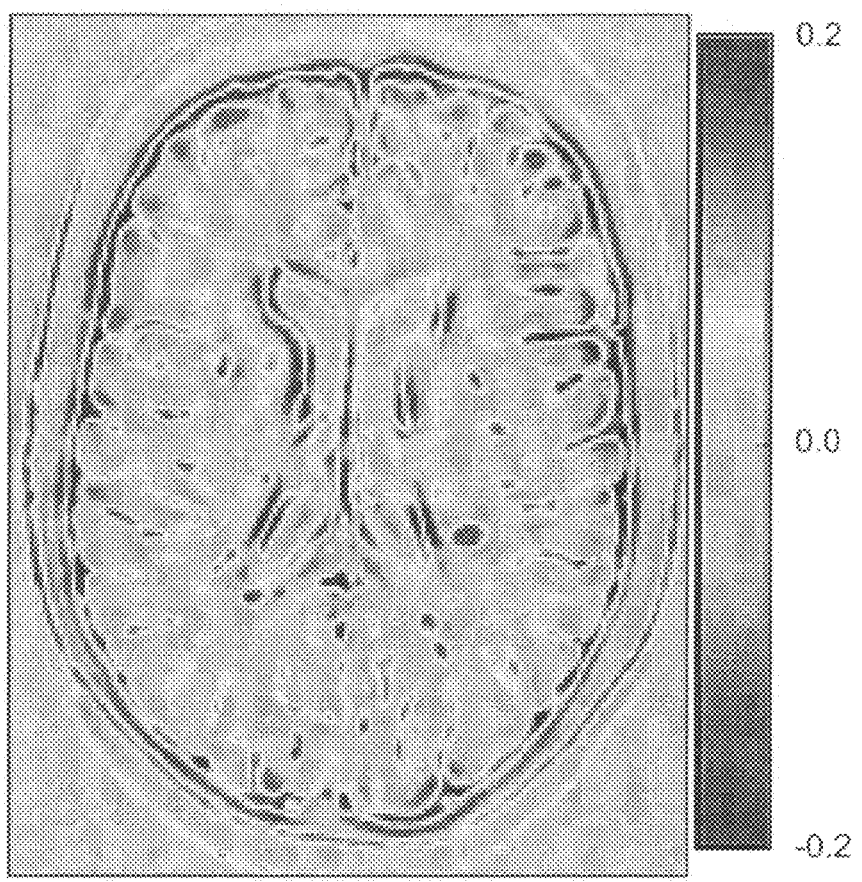

The filtering of the LFE also highlights intensity changes corresponding to other structures in the brain. For example, FIG. 8 shows the LFE filtered image for the entire brain at month 1. FIG. 8 shows highlighted intensity changes between structures of different intensity, including lesions, and also borders between brain tissue and surrounding CSF. Part of this appearance is due to ringing artifacts from the filter used to isolate the LFE frequencies. Optionally, other filters are employed which selectively enhance or suppress specific frequency components.

The present invention has been described herein with regard to preferred embodiments. However, it will be obvious to persons skilled in the art that a number of variations and modifications can be made without departing from the scope of the invention as described herein.

What is claimed is:

1. A method comprising:
   receiving a multi-dimensional image data set indicative of an image of an object;
   determining data indicative of a complex-valued local spatial frequency distribution in space-frequency domain by processing the multi-dimensional image data set based on a Stockwell transform with a phase term corresponding to spatial locations of respective frequency components being expressed in terms of a radial distance and an angle of orientation, the complex-valued local spatial frequency distribution being indicative of a feature of the object; and,
   providing the data indicative of a complex-valued local spatial frequency distribution.

2. A method as defined in claim 1 wherein the local spatial frequency distribution is determined by multiplying a Fourier transform of the multi-dimensional image data set with a sum of localizing windows of the Stockwell transform for a plurality of angles of orientation.

3. A method as defined in claim 2 wherein the localizing windows are determined as a function of frequency.

4. A method as defined in claim 3 wherein the localizing windows are determined as circularly symmetric windows.

5. A method as defined in claim 4 wherein a radial cross-section of the localizing windows is a Gaussian function with width proportional to the frequency.

6. A method as defined in claim 1 comprising generating visual display data in dependence upon the data indicative of a complex-valued local spatial frequency distribution for displaying the local spatial frequency distribution in a human comprehensible form; and displaying the visual display data.

7. A method as defined in claim 6 comprising smoothing the data indicative of a complex-valued local spatial frequency distribution.

8. A method as defined in claim 1 wherein the multi-dimensional image data set is a two dimensional image data set.

9. A method as defined in claim 8 wherein the local spatial frequency distribution is determined for each of a plurality of pixels of the image.

10. A method as defined in claim 1 comprising inverting the data indicative of a complex-valued local spatial frequency distribution into space domain.

11. A method as defined in claim 10 comprising filtering the data indicative of a complex-valued local spatial frequency distribution prior inverting.

12. A method as defined in claim 11 comprising determining data indicative of a low frequency energy distribution by filtering the data indicative of a complex-valued local spatial frequency distribution using a band-pass filter having a predetermined low frequency energy bandwidth.

13. A method as defined in claim 12 wherein the filtering is performed using a box-shaped band-pass filter.

14. A method as defined in claim 1 wherein at least a substantial portion of the multi-dimensional image data set is processed for determining the data indicative of a complex-valued local spatial frequency distribution.

15. A method as defined in claim 1 wherein the multi-dimensional image data set is indicative of a medical image.

16. A method as defined in claim 15 wherein the medical image is a magnetic resonance image.

17. A method as defined in claim 12 wherein the multi-dimensional image data set is indicative of a magnetic resonance image and wherein the band-pass filter is predetermined such that multiple sclerosis lesions are revealed.

18. A method comprising:
receiving a multi-dimensional image data set indicative of an image of an object;
determining data indicative of a complex-valued local spatial frequency distribution in space-frequency domain by processing the multi-dimensional image data set by multiplying a Fourier transform of the multi-dimensional image data set by a sum of localizing windows of a polar Stockwell transform for a plurality of angles of orientation, the complex-valued local spatial frequency distribution being indicative of a feature of the object; and, providing the data indicative of a complex-valued local spatial frequency distribution.

19. A storage medium having stored therein executable commands for execution on a processor, the processor when executing the commands performing:
receiving a multi-dimensional image data set indicative of an image of an object;
determining data indicative of a complex-valued local spatial frequency distribution in space-frequency domain by processing the multi-dimensional image data set based on a Stockwell transform expressed in terms of radial distance and angle of orientation with a phase term corresponding to spatial locations of respective frequency components, the complex-valued local spatial frequency distribution being indicative of a feature of the object; and,
providing the data indicative of a complex-valued local spatial frequency distribution.

20. A storage medium as having stored therein executable commands for execution on a processor as defined in claim 19, the processor when executing the commands performing:
inverting the data indicative of a complex-valued local spatial frequency distribution into space domain.

21. A storage medium as having stored therein executable commands for execution on a processor as defined in claim 20, the processor when executing the commands performing:
filtering the data indicative of a complex-valued local spatial frequency distribution prior inverting.

22. A storage medium as having stored therein executable commands for execution on a processor as defined in claim 21, the processor when executing the commands performing:
determining data indicative of a low frequency energy distribution by filtering the data indicative of a complex-valued local spatial frequency distribution using a band-pass filter having a predetermined low frequency energy bandwidth.

* * * * *